United States Patent
Visconti et al.

(10) Patent No.: US 8,400,287 B2
(45) Date of Patent: Mar. 19, 2013

(54) METHOD FOR ASSISTING HIGH-PERFORMANCE DRIVING OF A VEHICLE

(75) Inventors: Amedeo Visconti, Turin (IT); Martino Cavanna, Vimercate (IT)

(73) Assignee: Ferrari S.p.A. (IT)

( * ) Notice: Subject to any disclaimer, the term of this patent is extended or adjusted under 35 U.S.C. 154(b) by 565 days.

(21) Appl. No.: 12/653,798

(22) Filed: Dec. 18, 2009

(65) Prior Publication Data

US 2010/0164703 A1   Jul. 1, 2010

(30) Foreign Application Priority Data

Dec. 22, 2008  (IT) ................ BO2008A0768

(51) Int. Cl.
*B60Q 1/00*   (2006.01)

(52) U.S. Cl. ........................ 340/438; 701/301

(58) Field of Classification Search ............ 340/438, 340/436; 701/96, 301; 180/179
See application file for complete search history.

(56) References Cited

U.S. PATENT DOCUMENTS

| | | | |
|---|---|---|---|
| 5,835,881 A | 11/1998 | Trovato et al. | |
| 5,978,731 A * | 11/1999 | Matsuda | 701/301 |
| 6,269,307 B1 * | 7/2001 | Shinmura et al. | 701/301 |
| 6,772,059 B2 * | 8/2004 | Hellmann et al. | 701/96 |
| 7,124,027 B1 | 10/2006 | Ernst et al. | |
| 7,792,624 B2 * | 9/2010 | Nakamura et al. | 340/438 |

FOREIGN PATENT DOCUMENTS

| | | |
|---|---|---|
| DE | 102004030997 A1 | 1/2006 |
| DE | 102006016185 A1 | 10/2007 |
| EP | 1693242 A2 | 8/2006 |
| WO | WO-02/30700 A2 | 4/2002 |

OTHER PUBLICATIONS

"European Application Serial No. 09180384.1, European Search Report dated Mar. 19, 2010", 7 pgs.
"Italian Application Serial No. IT b020080768, Search Report dated Sep. 23, 2009", 2 pgs.

* cited by examiner

*Primary Examiner* — John A Tweel, Jr.
(74) *Attorney, Agent, or Firm* — Schwegmen Lundberg & Woessner, P.A.

(57) ABSTRACT

An assistance method for performance driving of a vehicle; the assistance method includes the steps of: identifying a route used by the vehicle; on each section of the route, identifying the optimum point for the operation of an accelerator command, a brake command, a steering command and/or a gearbox command; identifying the current position of the vehicle along the route; identifying the next optimum point for the operation of a command; identifying a warning advance in accordance with an estimate of the reaction time of the driver and in accordance with the current speed and acceleration of the vehicle; and signalling to the driver to operate the command using the previously identified warning advance so that the driver actually operates the command at the optimum point of operation.

20 Claims, 2 Drawing Sheets

METHOD FOR ASSISTING HIGH-PERFORMANCE DRIVING OF A VEHICLE

RELATED APPLICATION

This application claims the benefit of priority, under 35 U.S.C. Section 119, to Italian Patent Application Serial No. B02008A 000768 filed on Dec. 22, 2008 which is incorporated herein by reference in its entirety.

TECHNICAL FIELD

The present invention relates to an assistance method for performance driving of a vehicle.

PRIOR ART

The speed limits on roads open to the public are much lower than the performance offered by a high-performance sports car; therefore, during normal driving on roads open to the public only a small part of the capabilities of a high-performance sports car are used. For this reason, increasingly more often the owners of high-performance sports car occasionally run laps on tracks to fully exploit the performance offered by their cars. However, for inexpert drivers, performance driving on a track is very complicated, because it is very different from everyday driving on roads open to the public; in particular, for inexpert drivers, it is very complicated to understand the actual car limits, and therefore there is the possibility of not fully exploiting the performance offered by their cars and, on the other hand, there is the risk of going off road, which is potentially dangerous both for the car integrity and for the driver's safety.

Several electronic, driving-assistance devices have been developed (e.g. Anti-blocking Braking System (ABS), Acceleration Slip Regulation (ASR), stability control, etc.) which modify the commands imparted by the driver in accordance with the actual car limits. However the excessively frequent intervention of the electronic, driving-assistance devices subtracts driving pleasure from performance driving, and thus their continuous intervention is rather frustrating for a driver running on a track. Moreover, the electronic driving-assistance devices are of no use beyond the physical car limits; for example, the ABS avoids the wheels from blocking while braking, thus allowing efficient braking also when the brake pedal is pressed too hard, but if the braking event is started too late it cannot prevent the car from going off road.

DE102006016185A1 describes an assistance method for performance driving which allows to learn the optimum trajectory when driving on a track. During a first step, the instantaneous position of the vehicle is identified, and, in accordance with the instantaneous position of the vehicle, at least the steering commands are automatically generated by an electronic control unit by means of an actuator so that the vehicle automatically travels along the optimum trajectory. During a second step, the driver directly controls the steering, and the electronic control unit indicates possible differences between the actual trajectory of the vehicle and the optimum trajectory of the vehicle to the driver. Finally, during a third step, the driver is completely free when he/she is driving and receives a feedback on his/her way of driving only afterwards.

DESCRIPTION OF THE INVENTION

It is the object of the present invention to provide an assistance method for performance driving of a vehicle, which method is free from the above-described drawbacks and is concurrently easy and cost-effective to be implemented.

According to the present invention, an assistance method for performance driving of a vehicle is provided as claimed in the attached claims.

BRIEF DESCRIPTION OF THE DRAWINGS

The present invention will now be described with reference to the accompanying drawings, which illustrate a non-limitative embodiment thereof, in which.

PREFERRED EMBODIMENTS OF THE INVENTION

Figure 1:
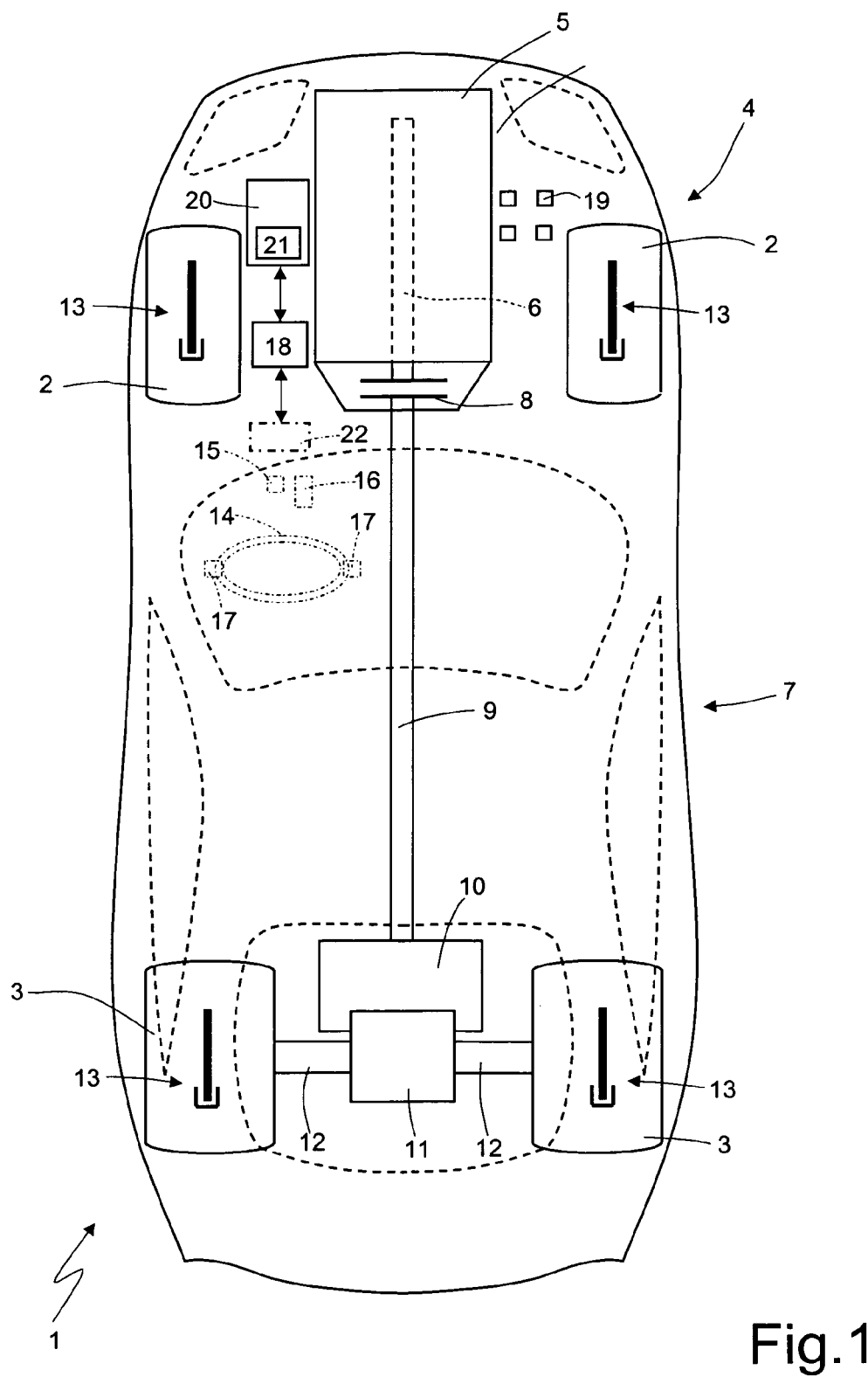
FIG. 1 is a diagrammatic plan view, with parts removed for clarity, of a high-performance sports car which implements the assistance method for performance driving of the present invention.

In FIG. 1, numeral 1 indicates as a whole a road vehicle, in particular a car, provided with two front wheels 2 and two rear drive wheels 3, which receive driving torque from a power system 4.

The power system 4 comprises a thermal, internal combustion engine 5 which is arranged in a frontal position and is provided with a drive shaft 6, and a servo-controlled gearbox 7 which transmits the driving torque generated by the internal combustion engine 5 to the rear drive wheels 3 and comprises a servo-controlled clutch 8 accommodated in a bell integral with the internal combustion engine 5.

Clutch 8 is interposed between the drive shaft 6 and a propeller shaft 9 ending in a mechanical servo-controlled gearbox 10, which is arranged in a rear position and is provided with a primary shaft connected to the propeller shaft 9 and a secondary shaft connected to a differential 11 from which a pair of drive axles 12 integral with the rear drive wheels 3 depart. Car 1 further comprises a braking system 13 (diagrammatically shown), comprising four disc brakes, each of which is coupled to a respective wheel 2 or 3.

Within a passenger compartment of car 1 there is a steering wheel 14, which is adapted to impart a steering angle to the front wheels 2 by means of a servo-assisted steering system, a brake command consisting of a brake pedal 15, which is adapted to control the braking system 13 for generating a braking torque on wheels 2 and 3, and an accelerator command consisting of an accelerator pedal 16, which is adapted to adjust the driving torque generated by the internal combustion engine 5. Two paddles 17 are arranged by the side of the steering wheel 14, which paddles control the servo-controlled gearbox 7 by requesting to shift up or to shift down in a sequential manner, respectively.

Car 1 further comprises an electronic control unit 18 (diagrammatically shown), which controls the braking system 13 and the power system 4 (and thus drives the internal combustion engine 5 and the servo-controlled gearbox 7) in accordance with the commands imparted by the driver on steering wheel 14, pedals 15 and 16, and paddles 17.

The electronic control unit 18 is connected to a series of sensors 19, which are distributed inside the car 1 and are adapted to detect the respective parameters of car 1 in real time, such as for example the forward speed of car 1, the steering angle of car 1, the yaw speed of car 1, the lateral acceleration of car 1, the longitudinal acceleration of car 1, the rotation speed of each rear drive wheel 3, the position of the accelerator pedal 16, the position of the brake pedal 15, the driving torque generated by the internal combustion engine 5 and the side-slip angle of car 1, i.e. the angle existing between the forward direction of car 1 and the longitudinal axis of the car 1 itself. It becomes apparent that the electronic control unit 18 may consist of several physically separate processing units connected to one another, for example, by a data bus; furthermore, in order to detect one or more parameters of car 1, an estimating algorithm implemented by the electronic control unit 18 itself may be used instead of a physical sensor 19.

Moreover, the electronic control unit 18 is connected to a positioning device 20, i.e. a device which is able to provide the instantaneous position of car 1. In order to accurately identify the instantaneous position of car 1, the positioning device 20 could use the information provided by a satellite positioning system according to the GPS standard and/or the information from sensors 19, such as for example the forward speed of car 1 and the steering angle of car 1. The positioning device 20 comprises a memory 21, which stores the potential routes of car 1 to be able to provide not only the absolute instantaneous position of car 1, but also the relative instantaneous position of car 1 with respect to the current route.

Finally, the electronic control unit 18 is connected to a communication device 22, which is arranged inside the passenger compartment and is able to provide visual and/or acoustic indications to the driver. By way of example, the communication device 22 could provide indications by means of light warning lights arranged on a dashboard and/or on the crown or in the hub of the steering wheel 14, and could provide acoustic indications (even reproducing the human voice) by using a sound system (or radio).

Figure 2:
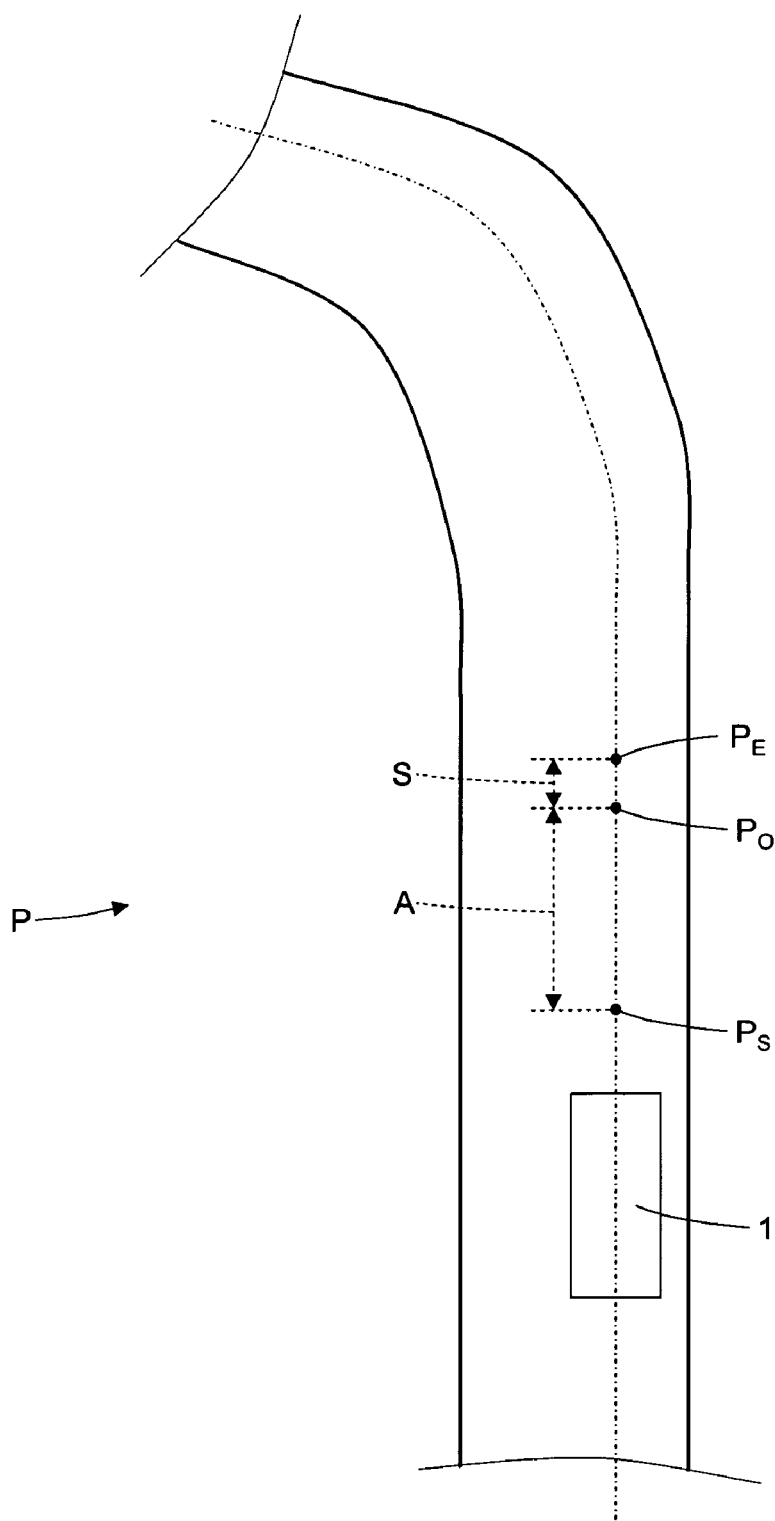
FIG. 2 is a diagrammatic plan view, with parts removed for clarity, of the car in FIG. 1 while traveling on a route.

With reference to FIG. 2, an assistance method for performance driving of car 1, which is implemented in the electronic control unit 18 and, when required by the driver, is run by the electronic control unit 18 itself, is described below.

Firstly, the route P (partially and diagrammatically illustrated in FIG. 2), which is to be used by car 1, and which typically consists of a loop circuit closed to public, of limited length (a few kilometers) to be traveled several times, is stored in memory 21 of the positioning device 20.

As will be described in greater detail below, the electronic control unit 18 identifies in each section of the route P the optimum point $P_O$ for the operation of an accelerator command (i.e. the accelerator pedal 16), a brake command (i.e. the brake pedal 15), a steering command (i.e. the steering wheel 14) and/or a gearbox command (i.e. the gearbox paddles 17). In particular, for simplicity, FIG. 2 shows only the optimum point $P_O$ for the operation of a brake command (i.e. the brake pedal 15). The optimum point $P_O$ for the operation of a command is the point where the command operation allows to optimize the performance of car 1, i.e. allows to approach the physical limit of car 1 without exceeding, however, the physical limit itself.

When traveling on route P, the electronic control unit 18 cyclically identifies the current position of car 1 along the route P with a sufficiently high frequency. Furthermore, when traveling on route P, the electronic control unit 18 identifies the next optimum point $P_O$ for the operation of a command (i.e. the optimum point $P_O$ for the operation of a command closest to the current position of car 1) and therefore, for the next optimum point $P_O$ for the operation of a command, the electronic control unit 18 identifies a warning advance A in accordance with an estimate of the reaction time of the driver and in accordance with the current speed and acceleration of car 1. The estimate of the reaction time of the driver is generally expressed in seconds or rather in fractions of second (e.g. 3 tenths of second) and indicates the time employed by the driver to actually operate a command once the indication to operate the command itself (i.e. the delay due to the reaction of the driver between the indication of operating the command and the actual operation of the command) has been received. The warning advance A (generally expressed in meters) is rapidly calculated by multiplying the current speed (or the expected speed) of car 1 by the estimate of the reaction time of the driver; in particular, when calculating the warning advance A, not only the current speed of car 1 is used, but also the current acceleration of car 1 is used, which indicates the evolution of the current speed of car 1 (i.e. the average car speed close to the next optimum point $P_O$ of operation is estimated by using the current acceleration speeds of car 1).

The electronic control unit 18 indicates to the driver the operation of the command with the previously identified warning advance A (i.e. at point $P_S$ in FIG. 2) so that the driver actually operates the command at the optimum point $P_O$ of operation. In other words, when car 1 is at a distance equal to the warning advance A from the next optimum point $P_O$ for the operation of a command (i.e. it is at point $P_S$ in FIG. 2), the electronic control unit 18 indicates to the driver the operation of the command so that, due to the delay due to the reaction time of the driver, he or she operates the command at the optimum point $P_O$ of operation.

According to a preferred embodiment, the electronic control unit 18 estimates and continuously updates the reaction time of the driver in accordance with the driver's driving features. The electronic control unit preferably identifies an operation difference S between the optimum point $P_O$ for the operation of a command and an actual point $P_E$ for the operation of the command (i.e. the point in which the command is actually operated), and updates the estimate of the driver's reaction time in accordance with the operation difference S. In particular, the electronic control unit improves the estimate of the reaction time of the driver (i.e. reduces the reaction time) when the operation difference S indicates that the actual point $P_E$ for the operation of the command is in advance to the optimum point $P_O$ of operation, and worsens the estimate of the reaction time of the driver (i.e. increases the reaction time) when the operation difference S indicates that the actual point $P_E$ for the operation of the command is delayed with respect to the optimum point $P_O$ of operation. The estimate of the reaction time of the driver is preferably updated by means of statistic calculations using a series of subsequent operation differences S.

According to a possible embodiment, the electronic control unit 18 uses a first estimate of the reaction time of the driver for operating the accelerator command, uses a second estimate of the reaction time of the driver for operating the brake command, uses a third estimate of the reaction time of the driver for operating the steering command, and uses a fourth estimate of the reaction time of the driver for operating the steering command. Such a differentiation is justified in that, due to the different physical location and to the different method of operating the commands, the delay due to the reaction time of the driver (slightly) changes from command to command.

According to a first embodiment, during a design step, a model of car 1 which provides an estimate of the dynamic behaviour of car 1 along the route P is identified and implemented in the electronic control unit 18; such a model is of known type and based on the laws of motion applied to car 1. While traveling on route P, the electronic control unit 18 estimates the current value of a number of dynamic parameters of car 1 (instantaneous speed, instantaneous acceleration, steering angle, etc.) using the sensors 19; moreover, on each section of the route P, the electronic control unit 18 identifies the optimum point $P_O$ fore the operation of a command by using the model of car 1 and providing the current value of the dynamic parameters of car 1 as an input to the model. The electronic control unit 18 preferably estimates an actual grip value of a road surface of the route P and uses the actual grip value in the model of car 1. In order to estimate the actual grip value, the electronic control unit 18 may use the signals provided by the ABS (Anti-blocking Braking System) and/or by the ASR (Acceleration Slip Regulation) systems, the intervention of which is directly related to the actual grip value. First, at least one complete test lap of route P is preferably performed to allow the electronic control unit 18 to estimate the actual grip value in advance, before starting to drive at the limit; during the test lap, the electronic control unit 18 could ask the driver by means of the communication device 22 to perform some test maneuvers (e.g. braking and/or accelerating hard on a straight) and could inform the driver when the actual grip value estimation is complete.

According to a different embodiment, the optimum points $P_O$ for the operation of the commands are identified before the car 1 uses the route P, e.g. by using an external driving simulator or by detecting the commands imparted by a professional driver while driving on the route P; the optimum points $P_O$ for the operation of the commands are then transferred to the memory 22 of the positioning device 20 before the car 1 uses the route P. In this embodiment, the optimum points $P_O$ for the operation of the commands may be parametrically identified in accordance with the speed and acceleration of car 1; therefore, the electronic control unit 18 updates each optimum point $P_O$ for the operation of a command each time, in accordance with the instantaneous speed and acceleration of car 1.

According to a further embodiment, the optimum points $P_O$ for the operation of the commands are identified by applying both of the above-described methods, i.e. they are identified in advance, before car uses the route P and are then updated by the electronic control unit 18 using the model of car 1.

According to a preferred embodiment, the electronic control unit 18 identifies a safety margin required by the driver in respect of a physical limit of car 1 by using the communication device 22; while traveling along the route P, the electronic control unit 18 uses the safety margin to identify the optimum points $P_O$ for the operation of the commands. In other words, the higher the safety margin required by the driver, the longer the distance that the electronic control unit 18 interposes between the optimum points $P_O$ for the operation of the commands and the physical limit of car 1. With regards to the operation of the brakes, the optimum point $P_O$ of operation is anticipated to increase the safety margin, while with regards to the operation of the accelerator, the optimum point $P_O$ of operation is delayed to increase the safety margin. With regards to the gearbox, the optimum point $P_O$ of operation is not modified in accordance with the safety margin because the operation of the gearbox does not have actual impacts on safety. With regards to steering, the optimum point $P_O$ of operation may not be modified (or not substantially in all cases) in accordance with the safety margin, because the operation of the steering is imposed by the physical features of the route.

As previously mentioned, the electronic control unit 18 estimates the reaction time and/or the driving ability of the driver in accordance with the driving characteristics of the driver himself/herself; preferably, while traveling on the route P, the electronic control unit 18 automatically increases the safety margin, independently from the driver's wishes when his/her reaction time and/or driving ability are lower than a first preset threshold value (i.e. are not suited to the safety margin required by the driver). Furthermore, the electronic control unit 18 allows to reduce the safety margin below a second preset threshold value only when the driver's reaction time and/or driving ability are higher than a third preset threshold value; in other words, the electronic control unit 18 allows to use a lower or even null safety margin only when the driver has actually proven to be able to drive the car 1 under these conditions.

Reference was previously made to all the possible commands of car 1 (accelerator, brakes, steering, gearbox), but the electronic control unit 18 could indicate to the driver only the optimum points $P_O$ for the operation of some commands (typically only the accelerator and brake), also to avoid providing too many indications to the driver, which could be confusing. Furthermore, the indication of using brakes, gearbox and accelerator are suited to an ON/OFF type use (i.e. "brake", "shift gear" and "accelerate") and, however, an excessive braking or accelerating event may be adequately compensated by the ABS (Anti-blocking Braking System) and by the ASR (Acceleration Slip Regulation) systems; on the other hand, steering indications are more complicated, because steering is never of the ON/OFF type but needs always to be adequately regulated.

As previously mentioned, the indication to operate a command may be of the acoustic type (typically by reproducing the human voice) and/or of the visual type by means of appropriate warning lights; for example, warning lights carried by the steering wheel 14 may be used for controlling the steering and a visual indication of the optimum steering angle could further be provided.

In the above-described embodiment, the assistance method for performance driving is applied to a car (i.e. to a motorcar) provided with four wheels; it is worth noting that according to a different embodiment, the method of controlling the side-slip angle could be applied to a motorcycle (i.e. to a motor vehicle) provided with two, three or four wheels.

The above-described assistance method for performance driving has several advantages.

Firstly, the above-described assistance method for performance driving is simple and cost-effective to be implemented even on an existing vehicle, because it uses hardware components which are normally present on a modern, high-performance sports vehicle.

Secondly, the above-described assistance method for performance driving allows to provide adequate, clear indications to inexpert drivers (i.e. non-professional drivers) to allow the drivers themselves to gradually, safely approach the limit of car 1, thus maximizing safe driving pleasure. In particular, the driver is free to choose the approaching extent to the limit of car 1, i.e. is free to choose which safety margin to keep in the various manoeuvres in accordance with his/her driving ability; thereby, the driver may gradually approach the limit of car 1 by gradually reducing the safety margin as time goes by.

Thirdly, the above-described assistance method for performance driving is self-adaptive with respect to the actual driving abilities of the driver, because it is able to understand by how much the driver can actually approach the limit of car 1, in accordance with the actual response time of the driver to the received indications.

Fourthly, the above-described assistance method for performance driving is self-adaptive with respect to the actual grip conditions of the road surface because in accordance with the signals received from the sensors 19, it is able to estimate with a high accuracy the grip of the road surface and is thus able to always keep a real and not only expected safety margin (i.e. based on real conditions directly measured and not on pre-identified statistical estimates).

The invention claimed is:

1. Assistance method for performance driving of a vehicle (1); the assistance method comprises the following steps:

estimating the reaction time of the driver in accordance with the driving characteristics of the driver;

identifying a route (P) used by the vehicle (1);

identifying on each section of the route (P) the optimum point ($P_o$) for the operation of an accelerator command, a brake command, a steering command and/or a gearbox command;

identifying the current position of the vehicle (1) along the route (P);

identifying the next optimum point ($P_o$) for the operation of a command;

identifying a warning advance (A) in accordance with the estimate of the reaction time of the driver and in accordance with the current speed and acceleration of the vehicle (1); and signalling to the driver to operate the command using the previously identified warning advance (A) so that the driver actually operates the command at the optimum point ($P_o$) of operation;

identifying a difference (S) in operation between the optimum point (PO) of operation for a command and an actual point (PE) of operation of a command; and updating the estimate of the reaction time of the driver in accordance with the difference (S) in operation.

2. Assistance method according to claim 1 and comprising the further steps of:

improving the estimate of the reaction time of the driver when the difference (S) in operation indicates that the actual point ($P_E$) of operation of the command is before the optimum point ($P_o$) of operation; and worsening the estimate of the reaction time of the driver when the difference (S) in operation indicates that the actual point ($P_E$) of operation of the command is after the optimum point ($P_o$) of operation.

3. Assistance method according to claim 1 and comprising the further steps of:

using a first estimate of the reaction time of the driver to operate the accelerator command;

using a second estimate of the reaction time of the driver to operate the brake command;

using a third estimate of the reaction time of the driver to operate the steering command; and using a fourth estimate of the reaction time of the driver to operate the gearbox command.

4. Assistance method according to claim 1 and comprising the further steps of:

determining, during a design stage, a model of the vehicle (1) which provides an estimate of the dynamic operation of the vehicle (1) along the route (P);

estimating the current value for a number of dynamic parameters on the vehicle (1); and identifying on a section of the route (P) the optimum point ($P_o$) of operation for a command using the model of the vehicle (1) and supplying as an input to the model the current value of the dynamic parameters for the vehicle (1).

5. Assistance method according to claim 1 and comprising the further steps of:

identifying the optimum points ($P_o$) of operation of the commands before the vehicle (1) starts the route (P); and transferring the optimum points ($P_o$) of operation of the commands into a memory on the vehicle (1) before the vehicle (1) starts the route (P).

6. Assistance method according to claim 5 and comprising the further steps of:

identifying the optimum points ($P_o$) of operation of the commands in parametric mode in accordance with the speed and acceleration of the vehicle (1); and updating from time to time each optimum point ($P_o$) of operation of a command in accordance with the instantaneous speed and acceleration of the vehicle (1).

7. Assistance method according to claim 1 and comprising the further steps of:

estimating the actual value of grip of a road surface of the route (P); and using the actual value of grip to identify the optimum points ($P_o$) of operation of the commands.

8. Assistance method according to claim 7 and comprising the further steps of:

performing at least one running test on a section of the route (P) to estimate beforehand the actual value of grip before starting to drive at the limit; and requesting the driver to perform several test manoeuvres to test the grip of the road surface during driving on the test section.

9. Assistance method according to claim 1 and comprising the further steps of:

identifying a margin of safety required by the driver in respect of a physical limit of the vehicle (1); and using the safety margin to identify the optimum points ($P_o$) of operation of the commands.

10. Assistance method according to claim 9 and comprising the further steps of:

estimating the reaction time of the driver and/or the driving ability in accordance with the driving characteristics of the driver; and increasing automatically and regardless of the wishes of the driver the margin of safety when the reaction time and/or the driving ability of the driver is/are less than a first preset threshold value.

11. Assistance method according to claim 9 and comprising the further steps of:

estimating the reaction time and/or the driving ability of the driver in accordance with the driving characteristics of the driver; and allowing a reduction in the margin of safety below a second preset threshold value only when the reaction time and/or the driving ability of the driver are greater than a third preset threshold value.

12. Assistance method for performance driving of a vehicle (1); the assistance method comprises the following steps:

identifying a route (P) used by the vehicle (1);

identifying on each section of the route (P) the optimum point (PO) for the operation of an accelerator command, a brake command, a steering command and/or a gearbox command;

identifying the current position of the vehicle (1) along the route (P);

identifying the next optimum point (PO) for the operation of a command;

identifying a warning advance (A) in accordance with an estimate of the reaction time of the driver and in accordance with the current speed and acceleration of the vehicle (1);

signalling to the driver to operate the command using the previously identified warning advance (A) so that the driver actually operates the command at the optimum point (PO) of operation;

using a first estimate of the reaction time of the driver to operate the accelerator command;

using a second estimate of the reaction time of the driver to operate the brake command;

using a third estimate of the reaction time of the driver to operate the steering command; and using a fourth estimate of the reaction time of the driver to operate the gearbox command.

13. Assistance method for performance driving of a vehicle (1); the assistance method comprises the following steps:
- determining, during a design stage, a model of the vehicle (1) which provides an estimate of the dynamic operation of the vehicle (1) along the route (P);
- identifying a route (P) used by the vehicle (1);
- estimating the current value for a number of dynamic parameters on the vehicle (1);
- identifying on each section of the route (P) the optimum point (PO) for the operation of an accelerator command, a brake command, a steering command and/or a gearbox command using the model of the vehicle (1) and supplying as an input to the model the current value of the dynamic parameters for the vehicle (1);
- identifying the current position of the vehicle (1) along the route (P);
- identifying the next optimum point (PO) for the operation of a command;
- identifying a warning advance (A) in accordance with an estimate of the reaction time of the driver and in accordance with the current speed and acceleration of the vehicle (1); and
- signalling to the driver to operate the command using the previously identified warning advance (A) so that the driver actually operates the command at the optimum point (PO) of operation.

14. Assistance method for performance driving of a vehicle (1); the assistance method comprises the following steps:
- identifying a route (P) used by the vehicle (1);
- identifying on each section of the route (P) the optimum point (PO) for the operation of an accelerator command, a brake command, a steering command and/or a gearbox command before the vehicle (1) starts the route (P);
- transferring the optimum points (PO) of operation of the commands into a memory on the vehicle (1) before the vehicle (1) starts the route (P);
- identifying the current position of the vehicle (1) along the route (P);
- identifying the next optimum point (PO) for the operation of a command;
- identifying a warning advance (A) in accordance with an estimate of the reaction time of the driver and in accordance with the current speed and acceleration of the vehicle (1); and
- signalling to the driver to operate the command using the previously identified warning advance (A) so that the driver actually operates the command at the optimum point (PO) of operation.

15. Assistance method according to claim 14 and comprising the further steps of:
- identifying the optimum points (PO) of operation of the commands in parametric mode in accordance with the speed and acceleration of the vehicle (1); and
- updating from time to time each optimum point (PO) of operation of a command in accordance with the instantaneous speed and acceleration of the vehicle (1).

16. Assistance method for performance driving of a vehicle (1); the assistance method comprises the following steps:
- identifying a route (P) used by the vehicle (1);
- estimating the actual value of grip of a road surface of the route (P); and
- identifying on each section of the route (P) the optimum point (PO) for the operation of an accelerator command, a brake command, a steering command and/or a gearbox command by using the actual value of grip;
- identifying the current position of the vehicle (1) along the route (P);
- identifying the next optimum point (PO) for the operation of a command;
- identifying a warning advance (A) in accordance with an estimate of the reaction time of the driver and in accordance with the current speed and acceleration of the vehicle (1); and
- signalling to the driver to operate the command using the previously identified warning advance (A) so that the driver actually operates the command at the optimum point (PO) of operation.

17. Assistance method according to claim 16 and comprising the further steps of:
- performing at least one running test on a section of the route (P) to estimate beforehand the actual value of grip before starting to drive at the limit; and
- requesting the driver to perform several test manoeuvres to test the grip of the road surface during driving on the test section.

18. Assistance method for performance driving of a vehicle (1); the assistance method comprises the following steps:
- identifying a margin of safety required by the driver in respect of a physical limit of the vehicle (1);
- identifying a route (P) used by the vehicle (1);
- identifying on each section of the route (P) the optimum point (PO) for the operation of an accelerator command, a brake command, a steering command and/or a gearbox command by using the safety margin;
- identifying the current position of the vehicle (1) along the route (P);
- identifying the next optimum point (PO) for the operation of a command;
- identifying a warning advance (A) in accordance with an estimate of the reaction time of the driver and in accordance with the current speed and acceleration of the vehicle (1); and
- signalling to the driver to operate the command using the previously identified warning advance (A) so that the driver actually operates the command at the optimum point (PO) of operation.

19. Assistance method according to claim 18 and comprising the further steps of:
- estimating the reaction time of the driver and/or the driving ability in accordance with the driving characteristics of the driver; and
- increasing automatically and regardless of the wishes of the driver the margin of safety when the reaction time and/or the driving ability of the driver is/are less than a first preset threshold value.

20. Assistance method according to claim 18 and comprising the further steps of:
- estimating the reaction time and/or the driving ability of the driver in accordance with the driving characteristics of the driver; and
- allowing a reduction in the margin of safety below a second preset threshold value only when the reaction time and/or the driving ability of the driver are greater than a third preset threshold value.

* * * * *